(12) United States Patent
Shindo et al.

(10) Patent No.: US 12,735,031 B2
(45) Date of Patent: Sep. 15, 2026

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Saki Shindo, Tokyo (JP); Yuta Okazaki, Tokyo (JP); Takumi Iguro, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/986,764

(22) Filed: Dec. 19, 2024

(65) Prior Publication Data

US 2025/0214578 A1 Jul. 3, 2025

(30) Foreign Application Priority Data

Dec. 27, 2023 (JP) ................................ 2023-221363

(51) Int. Cl.
*B60W 30/12* (2020.01)
*B60W 30/18* (2012.01)
(Continued)

(52) U.S. Cl.
CPC ...... *B60W 30/12* (2013.01); *B60W 30/18145* (2013.01); *B60W 40/06* (2013.01); (Continued)

(58) Field of Classification Search
CPC ............ B60W 30/12; B60W 2552/53; B60W 2552/30; B60W 30/18145;
(Continued)

(56) References Cited

U.S. PATENT DOCUMENTS

2015/0274164 A1 10/2015 Terazawa et al.
2020/0207346 A1 7/2020 Tsuji et al.
(Continued)

FOREIGN PATENT DOCUMENTS

CN 114954516 8/2022
JP 2004-345505 12/2004
(Continued)

OTHER PUBLICATIONS

Japanese Office Action for Japanese Patent Application No. 2023-221363 mailed Jun. 24, 2025.

*Primary Examiner* — Rodney A Butler
(74) *Attorney, Agent, or Firm* — Amin, Turocy & Watson, LLP

(57) ABSTRACT

A vehicle control device recognizes a road marking of a course of a vehicle, determines that the vehicle is likely to deviate from the road marking when it is determined that the remaining time before the vehicle reaches the road marking obtained on the basis of a position of the road marking relative to the vehicle and a state of the vehicle is less than or equal to a threshold value, changes the threshold value on the basis of a degree of change in a degree of curve of the course, and controls assistance for suppressing the vehicle's deviation from the road marking when it is determined that the vehicle is likely to deviate from the road marking.

9 Claims, 12 Drawing Sheets

(51) Int. Cl.
*B60W 40/06* (2012.01)
*B60W 40/072* (2012.01)
*B60W 50/14* (2020.01)

(52) U.S. Cl.
CPC .......... *B60W 40/072* (2013.01); *B60W 50/14* (2013.01); *B60W 2050/143* (2013.01); *B60W 2552/30* (2020.02); *B60W 2552/53* (2020.02)

(58) Field of Classification Search
CPC ........... B60W 2050/143; B60W 50/14; B60W 40/06; B60W 40/072
See application file for complete search history.

(56) References Cited

U.S. PATENT DOCUMENTS

| | | | | |
|---|---|---|---|---|
| 2022/0266857 | A1 | 8/2022 | Tamura et al. | |
| 2024/0270257 | A1* | 8/2024 | Keidel | B60W 50/0097 |

FOREIGN PATENT DOCUMENTS

| | | |
|---|---|---|
| JP | 2006-178675 | 7/2006 |
| JP | 2015-189411 | 11/2015 |
| JP | 2017-189989 | 10/2017 |
| JP | 2020-104802 | 7/2020 |

* cited by examiner

FIG. 9

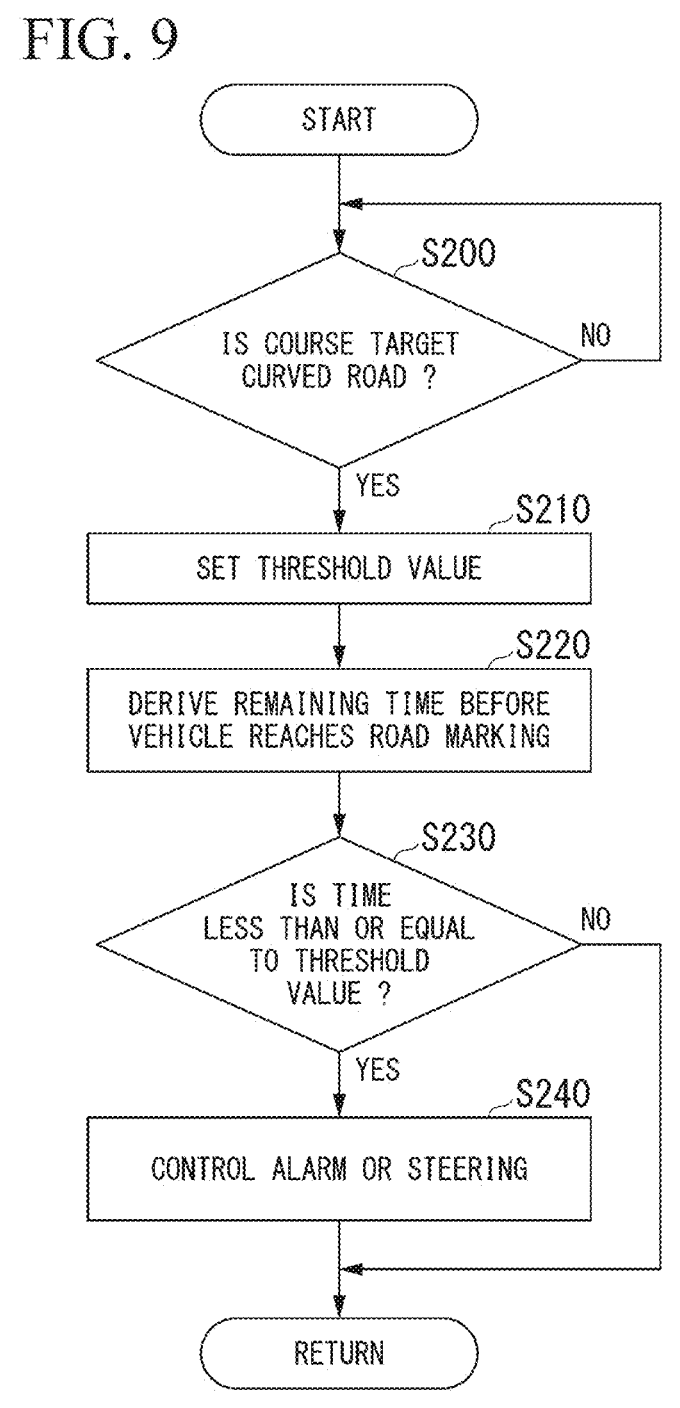

START
S200
IS COURSE TARGET CURVED ROAD ?
NO
YES
S210
SET THRESHOLD VALUE
S220
DERIVE REMAINING TIME BEFORE VEHICLE REACHES ROAD MARKING
S230
IS TIME LESS THAN OR EQUAL TO THRESHOLD VALUE ?
NO
YES
S240
CONTROL ALARM OR STEERING
RETURN

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2023-221363, filed Dec. 27, 2023, the content of which is incorporated herein by reference.

BACKGROUND

Field

The present invention relates to a vehicle control device, a vehicle control method, and a storage medium.

Description of Related Art

In recent years, efforts to provide access to sustainable transportation systems have been increasingly active in consideration of vulnerable individuals among participants in transportation. In pursuit of this realization, research and development on preventive safety technology is being emphasized to further improve the safety and convenience of transportation. For example, conventionally, a device including a curvature change detection means configured to detect a change in curvature of a route and a target deceleration calculation means configured to increase a deceleration control amount when the change in the curvature of the route is large is disclosed (Japanese Unexamined Patent Application, First Publication No. 2004-345505).

SUMMARY

Conventional devices have not adequately considered a process of performing assistance for suppressing a vehicle's deviation from a road marking.

The present invention has been made in consideration of such circumstances and an objective of the present invention is to provide a vehicle control device, a vehicle control method, and a storage medium for enabling a process of appropriately performing assistance for suppressing a vehicle's deviation from a road marking to be performed in accordance with an environment. Thereby, preventive safety technology is improved and the contribution to the development of a sustainable transportation system is improved.

A vehicle control device, a vehicle control method, and a storage medium according to the present invention adopt the following configurations.

(1): According to an aspect of the present invention, there is provided a vehicle control device including: a storage medium storing computer-readable instructions; and at least one processor connected to the storage medium, the processor executing the computer-readable instructions to: recognize a road marking of a course of a vehicle, determine that the vehicle is likely to deviate from the road marking when it is determined that the remaining time before the vehicle reaches the road marking obtained on the basis of a position of the road marking relative to the vehicle and a state of the vehicle is less than or equal to a threshold value, change the threshold value on the basis of a degree of change in a degree of curve of the course, and control assistance for suppressing the vehicle's deviation from the road marking when it is determined that the vehicle is likely to deviate from the road marking.

(2): In the above-described aspect (1), the at least one processor increases the threshold value as the degree of change in the degree of curve increases.

(3): In the above-described aspect (1), the at least one processor sets the threshold value to a first threshold value when the degree of change in the degree of curve is greater than or equal to a first degree of change, and sets the threshold value to a second threshold value less than the first threshold value when the degree of change in the degree of curve is less than the first degree of change.

(4): In the above-described aspect (1), the at least one processor sets the threshold value to a third threshold value when the degree of change in the degree of curve is greater than or equal to a second degree of change, and increases the threshold value from a fourth threshold value to the third threshold value as the degree of change increases between the third threshold value and the fourth threshold value less than the third threshold value when the degree of change in the degree of curve is less than the second degree of change and exceeds the third threshold value.

(5): In any one of the above-described aspects (1) to (4), the at least one processor executes a first change process of increasing the threshold value as the degree of change in the degree of curve increases when the degree of change increases as the degree of curve increases, and executes a second change process different from the first change process when the degree of change increases as the degree of curve decreases.

(6): In the above-described aspect (5), the second change process is a process of setting a preset threshold value regardless of the degree of change in the degree of curve or a process of setting the threshold value to a second threshold value less than a first threshold value, the first threshold value is a set threshold value that increases as the degree of change in the degree of curve increases when the degree of change increases in the first change process, and the second threshold value is a set threshold value that increases as the degree of change in the degree of curve increases when the degree of change increases in the second change process.

(7): In any one of the above-described aspects (1) to (4), when the at least one processor determines that the vehicle is likely to deviate from the road marking, a notification related to a deviation possibility is provided to a driver of the vehicle using a notifier or a steering control process is assisted so that the vehicle does not deviate from the road marking.

(8): In any one of the above-described aspects (1) to (4), when a shape of the course is a curved road, the at least one processor sets a preset threshold value as the threshold value in a threshold value setting process for a road marking on an inner side of the curved road, and sets the threshold value based on the degree of change in the degree of curve of the course in a threshold value setting process for a road marking on an outer side of the curved road.

(9): According to another aspect of the present invention, there is provided a vehicle control device including: a storage medium storing computer-readable instructions; and at least one processor connected to the storage medium, the processor executing the computer-readable instructions to: recognize a road marking of a course of a vehicle, perform a control process of providing a notification to a driver of the vehicle or an assistance control process of assisting in driving of the driver so that the vehicle does not deviate from the road marking when it is determined that the remaining time before the vehicle reaches the road marking obtained on the basis of a position of the road marking relative to the vehicle and a state of the vehicle is less than or equal to a threshold value, and change a timing when the assistance control process starts on the basis of a degree of change in a degree of curve of the course of the vehicle.

(10): In the above-described aspect (9), the at least one processor advances the timing as the degree of change in the degree of curve increases.

(11): According to yet another aspect of the present invention, there is provided a vehicle control method including: recognizing, by a computer, a road marking of a course of a vehicle; determining, by the computer, that the vehicle is likely to deviate from the road marking when it is determined that the remaining time before the vehicle reaches the road marking obtained on the basis of a position of the road marking relative to the vehicle and a state of the vehicle is less than or equal to a threshold value; changing, by the computer, the threshold value on the basis of a degree of change in a degree of curve of the course; and controlling, by the computer, assistance for suppressing the vehicle's deviation from the road marking when it is determined that the vehicle is likely to deviate from the road marking.

(12): According to yet another aspect of the present invention, there is provided a storage medium storing a program for causing a computer to: recognize a road marking of a course of a vehicle; determine that the vehicle is likely to deviate from the road marking when it is determined that the remaining time before the vehicle reaches the road marking obtained on the basis of a position of the road marking relative to the vehicle and a state of the vehicle is less than or equal to a threshold value; change the threshold value on the basis of a degree of change in a degree of curve of the course; and control assistance for suppressing the vehicle's deviation from the road marking when it is determined that the vehicle is likely to deviate from the road marking.

According to the aspects (1) to (12), it is possible to more appropriately perform assistance for suppressing the vehicle's deviation from the road marking in accordance with an environment. For example, even if the driver is late in noticing the curve or overlooks the curve, it is possible to perform the assistance for suppressing the vehicle's deviation from the road marking at a more appropriate timing (for example, earlier).

According to the aspect (2), the vehicle control device can more appropriately perform the assistance for suppressing the vehicle's deviation from the road marking in accordance with the degree of change in the curve. For example, the vehicle control device can perform the assistance for suppressing the vehicle's deviation from the road marking earlier.

According to the aspect (3), it is possible to more appropriately perform the assistance for suppressing the vehicle's deviation from the road marking in accordance with the degree of change in the degree of curve. For example, the vehicle control device can perform the assistance for suppressing the vehicle's deviation from the road marking at an appropriate timing so that excessive assistance is prevented and the timing when assistance begins is not delayed.

According to the aspect (5) or (6), the vehicle control device can more appropriately perform the assistance for suppressing the vehicle's deviation from the road marking in accordance with the position of the vehicle for the curved road. For example, at the exit of the curved road, assistance in which the driver is likely to find bothersome can be suppressed.

According to the aspect (8), because the vehicle control device sets an appropriate threshold value for each road marking, it is possible to more appropriately perform the assistance for suppressing the vehicle's deviation from the road marking while suppressing excessive assistance.

BRIEF DESCRIPTION OF THE DRAWINGS

FIG. 9 is a flowchart showing another example of the flow of the process executed by the driving assistance device.

DETAILED DESCRIPTION

First Embodiment

Overall Configuration

Figure 1:
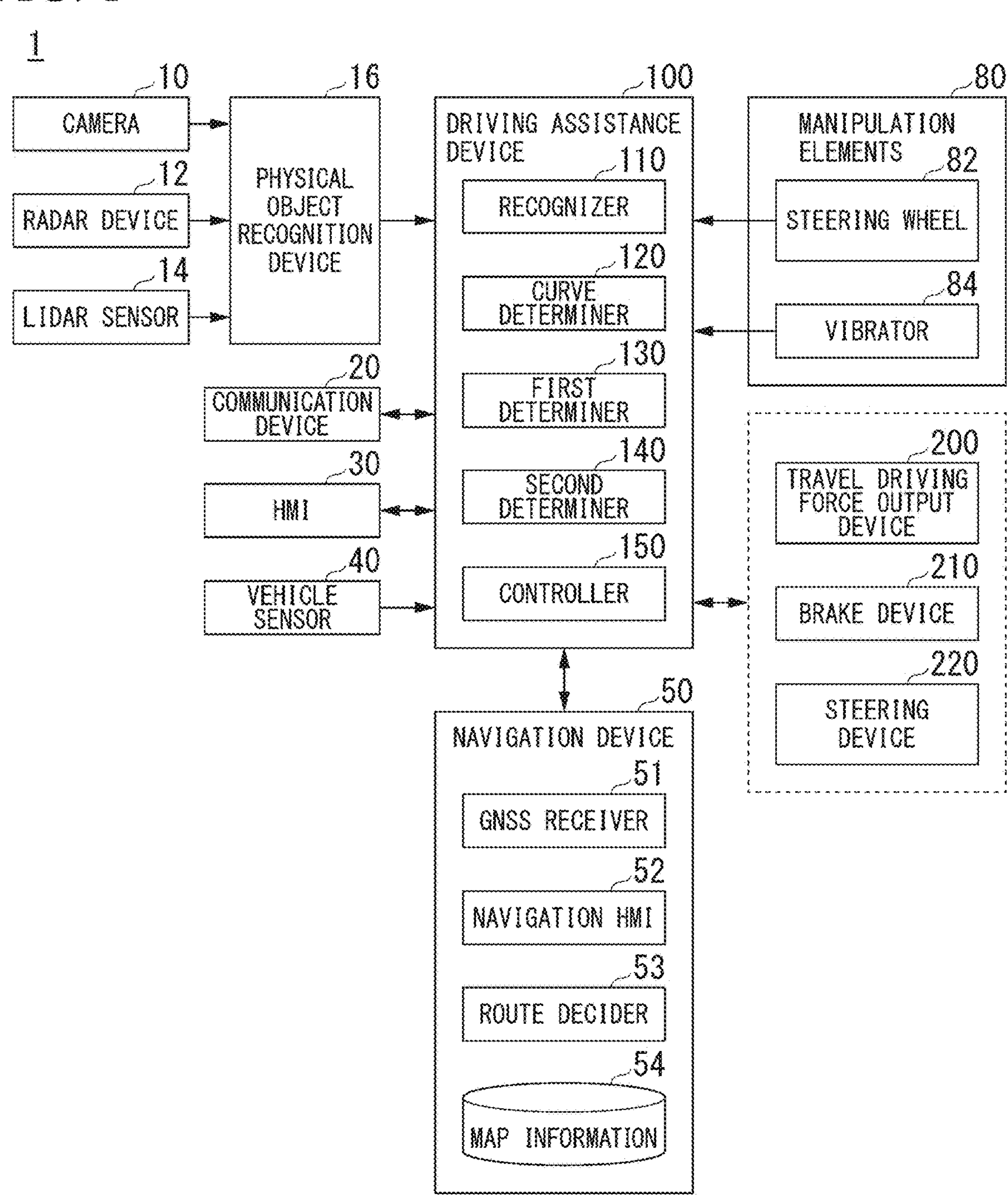
FIG. 1 is a configuration diagram of a vehicle system using a vehicle control device according to an embodiment.

FIG. 1 is a configuration diagram of a vehicle system 1 using a vehicle control system according to an embodiment. A vehicle in which the vehicle system 1 is mounted is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination thereof. The electric motor operates using electric power generated by a power generator connected to the internal combustion engine or electric power when a secondary battery or a fuel cell is discharged.

For example, the vehicle system 1 includes a camera 10, a radar device 12, a light detection and ranging (LIDAR) sensor 14, a physical object recognition device 16, a communication device 20, a human-machine interface (HMI) 30, a vehicle sensor 40, a navigation device 50, manipulation elements 80, a driving assistance device 100, a travel driving force output device 200, a brake device 210, and a steering device 220. Such devices and equipment are connected to each other by a multiplex communication line such as a controller area network (CAN) communication line, a serial communication line, or a wireless communication network or the like. The configuration shown in FIG. 1 is merely an example and some of the components may be omitted or other components may be further added. The driving assistance device 100 is an example of a "vehicle control device."

For example, the camera 10 is a digital camera using a solid-state imaging element such as a charge-coupled device (CCD) or a complementary metal oxide semiconductor (CMOS). The camera 10 is attached to any location on the vehicle (hereinafter referred to as a vehicle M) in which the vehicle system 1 is mounted. When the view in front of the vehicle M is imaged, the camera 10 is attached to an upper part of a front windshield, a rear surface of a rearview mirror, or the like. For example, the camera 10 periodically and iteratively images the surroundings of the vehicle M. The camera 10 may be a stereo camera.

The radar device 12 radiates radio waves such as millimeter waves around the vehicle M and detects at least a position (a distance to and a direction) of a physical object by detecting radio waves (reflected waves) reflected by the physical object. The radar device 12 is attached to any location on the vehicle M. The radar device 12 may detect a position and a speed of the physical object in a frequency-modulated continuous wave (FM-CW) scheme.

The LIDAR sensor 14 radiates light to the vicinity of the vehicle M (or electromagnetic waves having a wavelength close to that of light) and measures scattered light. The LIDAR sensor 14 detects a distance from an object on the basis of time from light emission to light reception. The radiated light is, for example, pulsed laser light. The LIDAR sensor 14 is attached to any location on the vehicle M.

The physical object recognition device 16 performs a sensor fusion process for detection results from some or all of the camera 10, the radar device 12, and the LIDAR sensor 14 to recognize a position, a type, a speed, and the like of a physical object. The physical object recognition device 16 outputs recognition results to the driving assistance device 100. The physical object recognition device 16 may output detection results of the camera 10, the radar device 12, and the LIDAR sensor 14 to the driving assistance device 100 as they are. The physical object recognition device 16 may be omitted from the vehicle system 1.

The communication device 20 communicates with another vehicle located in the vicinity of the vehicle M, using, for example, a cellular network or a Wi-Fi network, Bluetooth (registered trademark), dedicated short range communication (DSRC), or the like, or communicates with various types of server devices via a radio base station.

The HMI 30 presents various types of information to an occupant of the vehicle M and receives an input manipulation from the occupant. The HMI 30 includes various types of display devices, a speaker, a buzzer, a touch panel, a switch, keys, and the like. The HMI 30 includes a display device. The display device (display) is, for example, a display device, i.e., a multi-information display, for displaying various information in the vehicle M such as a speedometer indicating a movement speed of the vehicle M or a tachometer indicating a rotational speed of the internal combustion engine provided in the vehicle M provided in the center of the instrument panel of the vehicle M.

The vehicle sensor 40 includes a vehicle speed sensor configured to detect the speed of the vehicle M, an acceleration sensor configured to detect acceleration, a yaw rate sensor configured to detect angular velocity around a vertical axis, a direction sensor configured to detect a direction of the vehicle M, and the like.

For example, the navigation device 50 includes a global navigation satellite system (GNSS) receiver 51, a navigation HMI 52, and a route decider 53. The navigation device 50 holds map information 54 in a storage device such as a hard disk drive (HDD) or a flash memory. The GNSS receiver 51 identifies a position of the vehicle M on the basis of a signal received from a GNSS satellite. The position of the vehicle M may be identified or complemented by an inertial navigation system (INS) using an output of the vehicle sensor 40. The navigation HMI 52 includes a display device, a speaker, a touch panel, keys, and the like. The navigation HMI 52 may be partly or wholly shared with the above-described HMI 30. For example, the route decider 53 decides on a route (hereinafter referred to as a route on a map) from the position of the vehicle M identified by the GNSS receiver 51 (or any input position) to a destination input by the occupant using the navigation HMI 52 with reference to the map information 54. The map information 54 is, for example, information in which a road shape is expressed by a link indicating a road and nodes connected by the link. The map information 54 may include curvature of a road, point of interest (POI) information, and the like. For example, the map information 54 includes information indicating a specified speed (e.g., a speed limit or a legal speed) for each link indicating a road. The specified speed is information indicating, for example, the speed limit and the legal speed displayed on a road, a signboard provided on a road, or the like.

The navigation device 50 may perform route guidance using the navigation HMI 52 on the basis of the route on the map. The navigation device 50 may be implemented, for example, according to a function of a terminal device such as a smartphone or a tablet terminal possessed by the occupant. The navigation device 50 may transmit a current position and a destination to a navigation server via the communication device 20 and acquire a route equivalent to the route on the map from the navigation server.

The manipulation elements 80 include, for example, a manipulation switch of a direction indicator, an accelerator pedal, a brake pedal, a shift lever, and other manipulation elements (not shown). A sensor that detects an amount of manipulation or the presence or absence of manipulation is attached to the manipulation element, and the detection result is output to the driving assistance device 100 or some or all of the travel driving force output device 200, the brake device 210, and the steering device 220. The steering wheel does not necessarily have to be annular and may be in the form of a variant steering wheel, a joystick, a button, or the like. A steering grip sensor is attached to the steering wheel.

In addition to the above, the manipulation elements 80 include a steering wheel 82 and a vibrator 84. The vibrator 84 vibrates the steering wheel 82. For example, the vibrator 84 vibrates to notify the driver that the vehicle M has approached the road marking on the basis of an instruction of the driving assistance device 100.

The driving assistance device 100 includes, for example, a recognizer 110, a curve determiner 120, a first determiner 130, a second determiner 140, and a controller 150. Some or all of these functional units are implemented, for example, by a hardware processor such as a central processing unit (CPU) executing a program (software). Also, some or all of the above constituent elements may be implemented by hardware (including a circuit; circuitry) such as a large-scale integration (LSI) circuit, an application-specific integrated circuit (ASIC), a field-programmable gate array (FPGA), a graphics processing unit (GPU), a system on chip (SOC) or may be implemented by software and hardware in cooperation. The program may be pre-stored in a storage device (a storage device including a non-transitory storage medium) such as an HDD or a flash memory of the driving assistance device 100 or may be stored in a removable storage medium such as a DVD or a CD-ROM and installed in an HDD or a flash memory of the driving assistance device 100 when the storage medium (the non-transitory storage medium) is mounted in a drive device. The second determiner 140 or a functional unit in which the first determiner 130 and the second determiner 140 are combined is an example of a "determination processor."

On the basis of information input from the camera 10, the radar device 12, and the LIDAR sensor 14 via the physical object recognition device 16, the recognizer 110 recognizes a state of a position, velocity, acceleration, and the like of a physical object in the vicinity of the vehicle M. The position of the physical object, for example, is recognized as a position of an absolute coordinate system having a representative point of the vehicle M (a center of gravity, a drive shaft center, or the like) as the origin, and is used for control. The position of the physical object may be represented by a representative point such as the center of gravity or a corner of the physical object or may be represented in a region. The "state" of the physical object may include the acceleration or jerk of the physical object, or the "action state" (for example, whether or not the lane is changing or is about to change).

For example, the recognizer 110 recognizes a road marking near the vehicle M and recognizes a travel lane on the basis of the recognized road marking. The recognizer 110 may recognize a travel lane by recognizing a course boundary (road boundary) including a road marking, a shoulder, a curb, a median strip, a guardrail, and the like as well as a road marking. In this recognition, a position of the vehicle M acquired from the navigation device 50 or a processing result of the INS may be taken into account. The recognizer 110 recognizes a temporary stop line, an obstacle, red traffic light, a toll gate, other road events, a mark (a speed limit) marked on a road, and a road sign on which the speed limit is marked.

When the travel lane is recognized, the recognizer 110 recognizes a position or a posture of the vehicle M with respect to the travel lane. For example, the recognizer 110 may recognize a gap of a reference point of the vehicle M from the center of the lane and an angle formed between the movement direction of the vehicle M and a line connected to the center of the lane as a relative position and posture of the vehicle M related to the travel lane. Alternatively, the recognizer 110 may recognize a position of the reference point of the vehicle M related to one side end portion (a road marking or a road boundary) of the travel lane or the like as a relative position of the vehicle M related to the travel lane.

The curve determiner 120 determines whether or not a curved road on which the vehicle M moves (or a curved road on which the vehicle M is scheduled to move) is a target curved road. The target curved road is a curved road having a radius of curvature less than or equal to a threshold value (for example, 1000 m or less). The curve determiner 120 may determine the target curved road on the basis of a recognition result of the recognizer 110 or may determine the target curved road on the basis of a position where the vehicle M moves and the curved road information included in the map information (for example, a radius of curvature). The recognition result of the recognizer 110 is, for example, a shape of the road, a shape of a physical object (for example, a curb) provided on the road, and a shape of a road sign (for example, a road marking or the like). For example, it may be estimated whether or not the curved road is a target curved road on the basis of a shape of an entrance of the curved road or the road marking near the entrance and it may be determined whether or not the curved road is a target curved road on the basis of an estimation result.

The first determiner 130 changes a threshold value on the basis of a degree of change in a degree of curve of a course of the vehicle M. The degree of curve is, for example, an index indicating the degree of curve such as curvature. The first determiner 130 may acquire the degree of curve of the course using information indicating the degree of curve included in the map information or may acquire the degree of curve from the recognition result of the recognizer 110. Recognition results of the recognizer 110 are, for example, a shape of a road, a shape of a physical object (for example, a curb) provided on the road, and a shape of a road sign (for example, a road marking or the like). In the following description, a case where the degree of curve is acquired using the road marking will be described.

The second determiner 140 determines that the vehicle M is likely to deviate from the road marking when it is determined that the remaining time before the vehicle M reaches the road marking obtained on the basis of a position of the road marking relative to the vehicle M and a state of the vehicle M (e.g., a position, a movement direction, a speed, and acceleration) is less than or equal to a threshold value.

The controller 150 controls, for example, various types of functions and devices of the vehicle M and the like. The controller 150 controls the HMI 30, the vibrator 84, and the steering device 220 to perform a control process so that the vehicle M does not deviate from the road marking.

The controller 150 executes lane departure suppression control. The lane departure suppression control is a control process of suppressing the approach of the vehicle M toward the road marking by executing one or more of control processes (1) to (3) when the vehicle M approaches the road marking near the vehicle M. In control process (1), the controller 150 provides a notification with an image, a sound, or the like using an HMI. In control process (2), the controller 150 vibrates the steering wheel 82 using the vibrator 84. In control process (3), the controller 150 controls the steering device 220 so that the vehicle M returns to the center of the course (away from the road marking). In addition to the above, it is only necessary for the lane departure suppression control to be a control process of assisting the vehicle or the driver so that the vehicle does not deviate from the road marking. For example, the lane departure suppression control may be a control process of vibrating the driver's seat belt or turning on an outputter configured to output light.

The driving assistance device 100 may perform the above-described adaptive cruise control (ACC), lane keeping control for causing the vehicle M to move at the center of the lane, or a control process for making an automatic lane change (ALC) for causing the vehicle M to change lanes when an automatic lane change instruction has been issued from the driver.

The travel driving force output device 200 outputs a travel driving force (torque) for enabling the traveling of the vehicle M to the driven wheels. For example, the travel driving force output device 200 includes a combination of an internal combustion engine, an electric motor, a transmission, and the like, and an electronic control unit (ECU) that controls the internal combustion engine, the electric motor, the transmission, and the like mounted in the vehicle M. The ECU controls the above-described constituent elements in accordance with information input from the driving assistance device 100 or information input from the driving manipulation element.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the driving assistance device 100 or the information input from the driving manipulation element so that brake torque according to a brake manipulation is output to each wheel.

For example, the steering device 220 includes a steering ECU and an electric motor. For example, the electric motor changes a direction of steerable wheels by applying a force to a rack and pinion mechanism. The steering ECU drives the electric motor in accordance with the information input from the driving assistance device 100 or the information input from the driving manipulation element to change the direction of the steerable wheels.

Overview

The driving assistance device 100 determines that the vehicle M is likely to deviate from the road marking when it is determined that the remaining time before the vehicle M reaches the road marking obtained on the basis of a position of the road marking relative to the vehicle M and a state of the vehicle is less than or equal to a threshold value. The driving assistance device 100 changes the threshold value on the basis of a degree of change in a degree of curve of the course of the vehicle M. The driving assistance device 100 controls assistance for suppressing the vehicle M's deviation from the road marking when it is determined that the vehicle M is likely to deviate from the road marking.

When it is determined that the remaining time before the vehicle M reaches the road marking obtained on the basis of a position of the road marking relative to the vehicle M and a state of the vehicle M is less than or equal to a threshold value, the driving assistance device 100 performs a control process of providing a notification to a driver of the vehicle M or an assistance control process of assisting in driving of the driver so that the vehicle M does not deviate from the road marking. The driving assistance device 100 changes a timing when the assistance control process starts on the basis of a degree of change in a degree of curve of the course of the vehicle M.

In each of the above processes, the driving assistance device 100 may advance the timing when the assistance control process starts as the degree of change in the degree of curve of the course increases. Hereinafter, these processes will be described.

Figure 2:
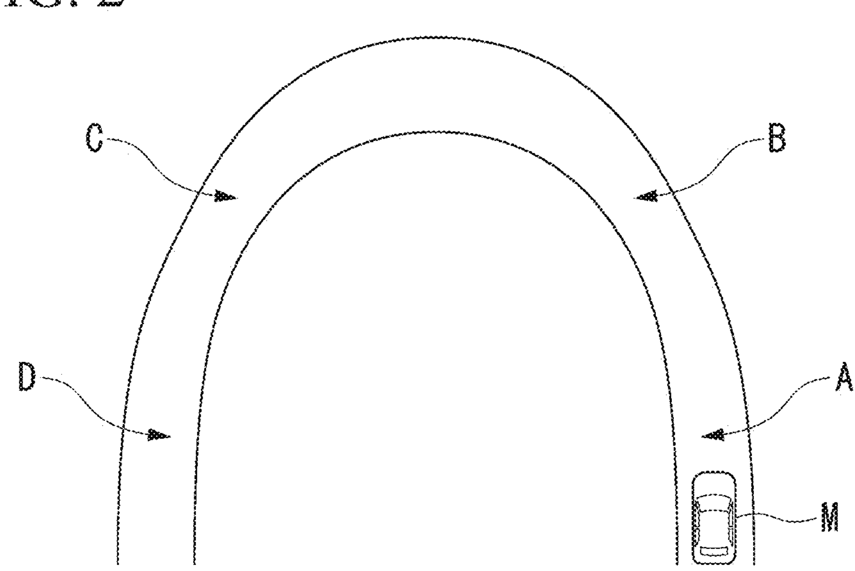
FIG. 2 is a diagram showing an example of a scene in which a vehicle moves on a target curved road.

When the vehicle M moves on the target curved road, the driving assistance device 100 performs the above-described determination and executes lane departure suppression control. FIG. 2 is a diagram showing an example of a scene in which the vehicle M moves on the target curved road. In the example shown in FIG. 2, it is assumed that the vehicle M passes through position A, position B, position C, and position D in that order. Position A is at or near the entrance of the curved road. Position B is a position that is a predetermined distance from the entrance. Position Cis a position that is a predetermined distance from position B. Position D is near the exit or entrance of the curved road.

Figure 3:
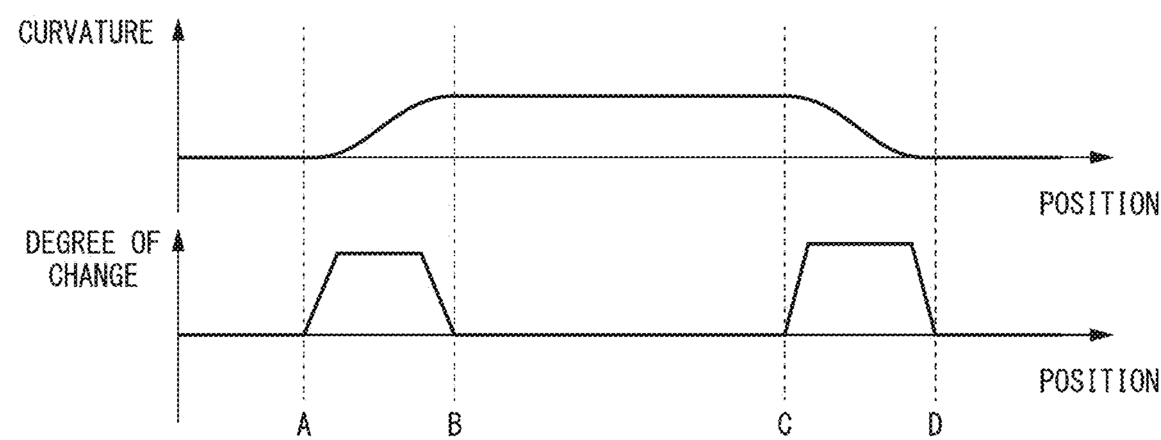
FIG. 3 is a diagram showing curvature at each position on the curved road of FIG. 2 and a degree of change in curvature.

FIG. 3 is a diagram showing curvature and a degree of change in the curvature for each position on the curved road of FIG. 2. In the upper drawing of FIG. 3, the vertical axis represents curvature and the horizontal axis represents a position. In the lower drawing of FIG. 3, the vertical axis represents a degree of change and the horizontal axis represents a position. Between position A and position B and between position C and position D, the curvature changes more than at other positions. The curvature is tending to increase between position A and position B and the curvature tends to decrease between position C and position D. Although the curvature between positions B and C is greater than the curvature of the other positions, the curvature is constant or substantially constant. For this reason, the degree of change is also zero or small.

As described above, in the curved road, the degree of change in curvature may tend to fluctuate at the entrance (near the entrance) and the exit (near the exit) of the curved road. In the present embodiment, the driving assistance device 100 controls an operation timing when the lane departure suppression control operates in accordance with the degree of change in the course. For example, the driving assistance device 100 advances the operation timing as the degree of change increases.

When the degree of change in the degree of curve of the course is greater than or equal to a first degree of change, the driving assistance device 100 sets the threshold value to a first threshold value. When the degree of change in the degree of curve of the course is less than the first degree of change, the driving assistance device 100 sets the threshold value to a second threshold value less than the first threshold value. A threshold value exceeding the remaining time before an operation timing OT2 or the remaining time before an operation timing OT1 of FIG. 4 to be described below is an example of the "first threshold value."

The driving assistance device 100 sets the threshold value to a third threshold value when the degree of change in the degree of curve of the course is greater than or equal to a second degree of change and increases the threshold value from a fourth threshold value to the third threshold value as the degree of change increases between the third threshold value and the fourth threshold value less than the third threshold value when the degree of change in the degree of curve of the course is less than the second degree of change and exceeds a third degree of change. The remaining time before the operation timing OT2 of FIG. 4 to be described below is an example of the "third threshold value." The remaining time before the operation timing exceeding the remaining time before the operation timing OT1 of FIG. 4 to be described below (or the operation timing OT2) is an example of the "fourth threshold value."

Figure 4:
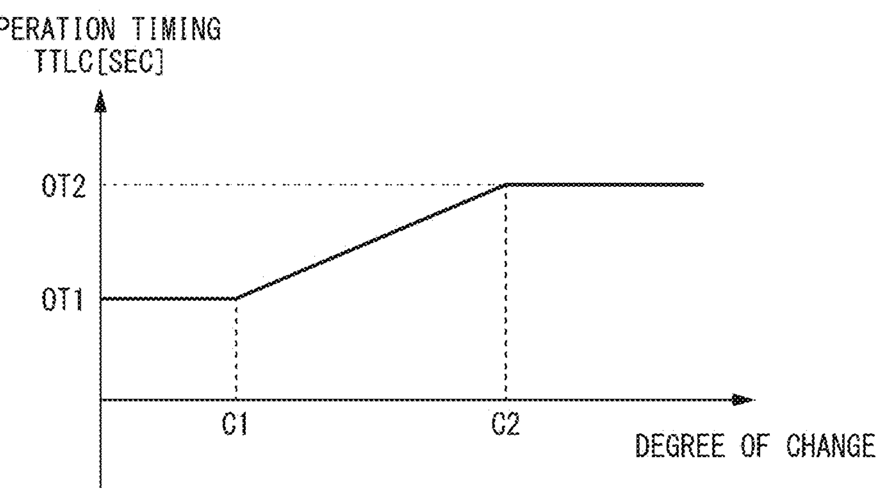
FIG. 4 is a diagram showing an example of an operation timing.

FIG. 4 is a diagram showing an example of the operation timing. In FIG. 4, the vertical axis represents an operation timing and the horizontal axis represents a degree of change. The degree of change is an absolute value of the degree of change. The remaining time before the operation timing is a time to line crossing (TTLC): the remaining time before the vehicle M reaches the road marking). It is indicated that a distance of the vehicle M from the road marking decreases (the vehicle M is more likely to deviate from the course) as a TTLC value decreases. As the remaining time before the operation timing becomes longer (or increases), the lane departure suppression control operates earlier (the vehicle M operates at a position further away from the road marking (e.g., a position closer to the center of the lane)).

For example, at the degree of change up to a degree of change C1, the lane departure suppression control operates at the operation timing OT1. For example, when the degree of change is greater than or equal to the degree of change C2, the lane departure suppression control operates at the operation timing OT2. The remaining time before the operation timing OT2 is longer than the remaining time before the operation timing OT1. As the degree of change increases between the degree of change exceeding the degree of change C1 and the degree of change less than the degree of change C2, the remaining time before the operation timing increases. Between the degree of change exceeding the degree of change C1 and the degree of change less than the degree of change C2, for example, the operation timing smoothly fluctuates in accordance with the degree of change as shown in FIG. 4, but the operation timing may change in a step manner. For example, the remaining time before the operation timing OT2 is twice or about twice the remaining time before the operation timing OT1. For example, the degree of change C2 is about 2 times, 2.4 times, and 2.5 times the degree of change C1.

As described above, as the degree of change increases, the lane departure suppression control is operated earlier. Specifically, the lane departure suppression control operates earlier between position A and position B or between position C and position D of FIG. 3, as described above, than between position B and position C. Thus, when the degree of change exceeds the degree of change C2 or the degree of change is less than the degree of change C1, the threshold value is fixed. When the degree of change exceeds the degree of change C1 and the degree of change is less than the degree of change C2, the threshold value is variable and the threshold value corresponding to the degree of change in the degree of curve is set. Thereby, an appropriate threshold value corresponding to the degree of change is set.

[Control when Degree of Change is Small]

Figure 5:
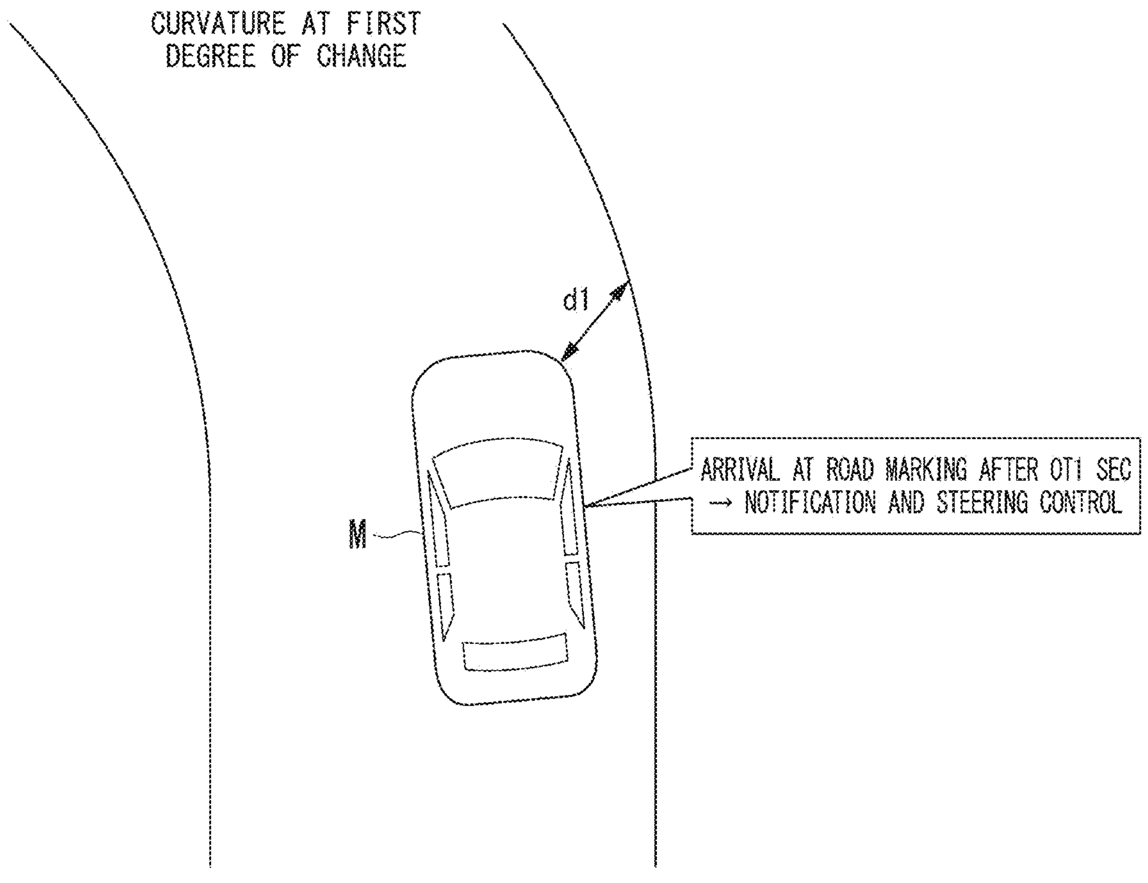
FIG. 5 is an explanatory diagram showing control when the degree of change in curvature is relatively small.

FIG. 5 is an explanatory diagram showing control when the degree of change in curvature is relatively small. When the vehicle M moves in a segment having the first degree of change in curvature, the operation timing is set to OT1, where the operation timing OT1 is relatively early. In this case, when the vehicle M is predicted to reach the road marking after OT1 sec (e.g., when the vehicle M reaches a position that is a distance d1 from the road marking), the driving assistance device 100 operates the lane departure suppression control.

[Control when the Degree of Change is Large]

Figure 6:
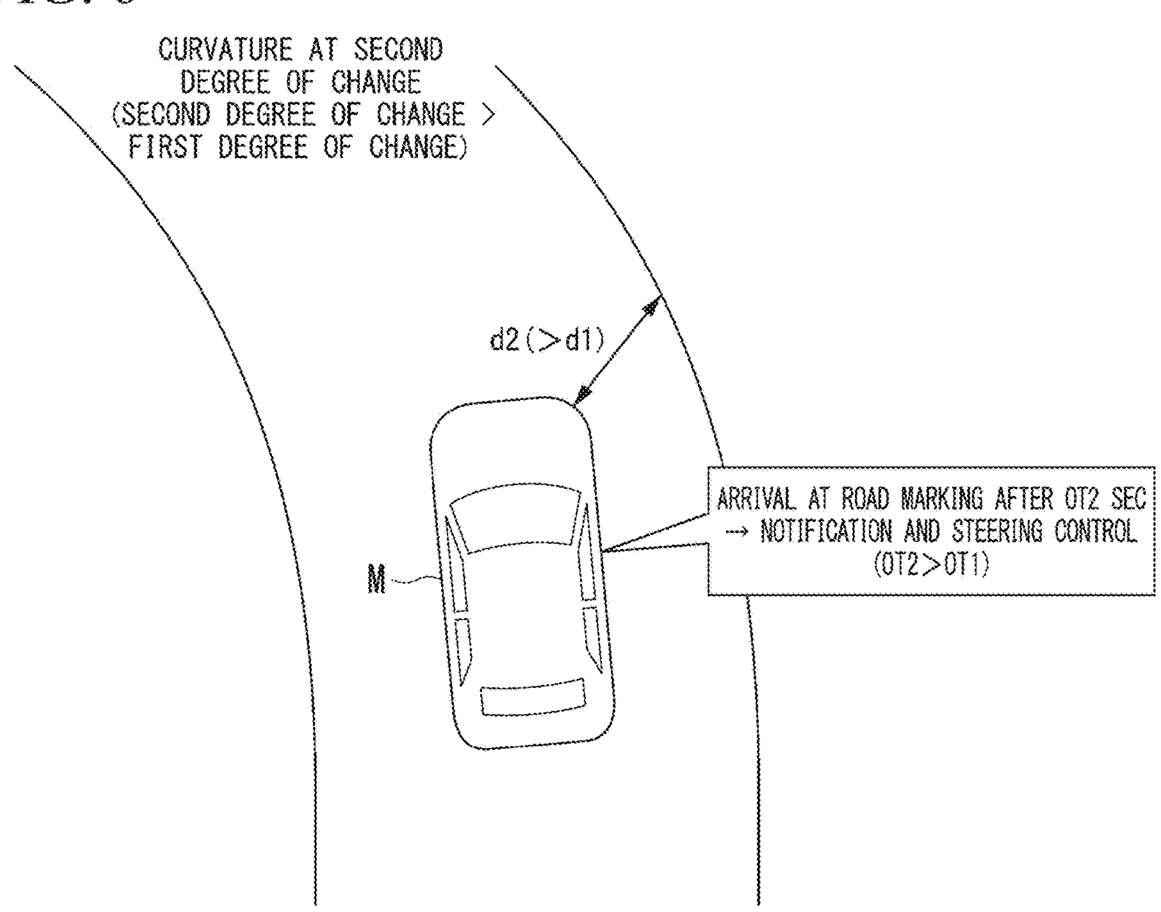
FIG. 6 is an explanatory diagram showing control when the degree of change in curvature is relatively large.

FIG. 6 is an explanatory diagram showing control when the degree of change in curvature is relatively large. When the vehicle M moves in a segment having the second degree of change in curvature, the operation timing is set to OT2, where the operation timing OT2 is relatively late. The second degree of change is greater than the first degree of change. In this case, when the vehicle M is predicted to reach the road marking after OT2 sec (e.g., when the vehicle M reaches a position that is a distance d2 (> the distance d1) from the road marking), the driving assistance device 100 operates the lane departure suppression control.

Thus, the driving assistance device 100 operates the lane departure suppression control earlier in the case of the second degree of change than in the case of the first degree of change. Thereby, the driving assistance device 100 can assist in more appropriately suppressing the vehicle's deviation from the road marking in accordance with an environment.

For example, the driver may not control the vehicle M in accordance with a curve. For example, the driver may overlook the curve or misrecognize the degree of change in the curve. When the above-described situation does not occur, the driver can control the vehicle M with plenty of time even if the lane departure suppression control operates at the set operation timing. On the other hand, when the above situation has occurred, the driver may not be able to control the vehicle M with plenty of time when the lane departure suppression control operates at the set operation timing. When the curve is overlooked or the degree of change in the curve is misrecognized, the driver may not have time to control the vehicle M even if the lane departure suppression control is performed at the set operation timing. Thus, if the operation timing of the lane departure suppression control is uniformly set, the assistance may not be sufficient.

On the other hand, in the present embodiment, the operation timing of the lane departure suppression control is changed with the degree of change in curvature. For example, when the driver does not control the vehicle M according to the curve, the driver overlooks the curve, or the driver misrecognizes the degree of change in the curve (for example, when the vehicle M moves in an environment where the degree of change in curvature tends to be large), the driving assistance device 100 operates the lane departure suppression control at the operation timing corresponding to the degree of change. Thereby, the driver can recognize the situation with plenty of time and control the vehicle M. That is, it is possible to assist in suppressing the vehicle's deviation from the road marking more appropriately in accordance with the environment.

[Flowchart (Part 1)]

Figure 7:
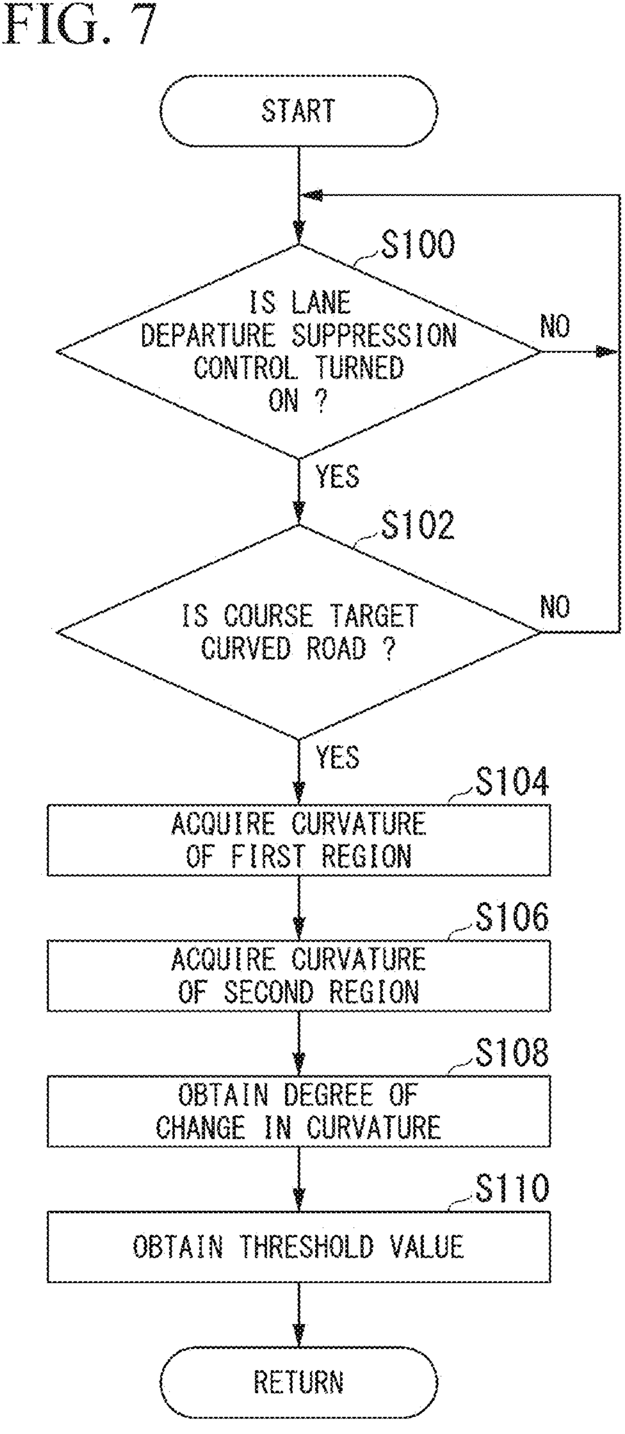
FIG. 7 is a flowchart showing an example of a flow of a process executed by a driving assistance device.

FIG. 7 is a flowchart showing an example of a flow of a process executed by the driving assistance device 100. First, the driving assistance device 100 determines whether or not the lane departure suppression control has been turned on (step S100). For example, the driver can set the state of the lane departure suppression control to an ON or OFF state by manipulating the HMI or a predetermined button.

When the lane departure suppression control has been turned on, the driving assistance device 100 determines whether or not a course along which the vehicle M moves is a target curved road (step S102). When the course is a target curved road, the driving assistance device 100 acquires the curvature of a first region of the course (step S104) and acquires the curvature of a second region of the course (step S106).

Figure 8:
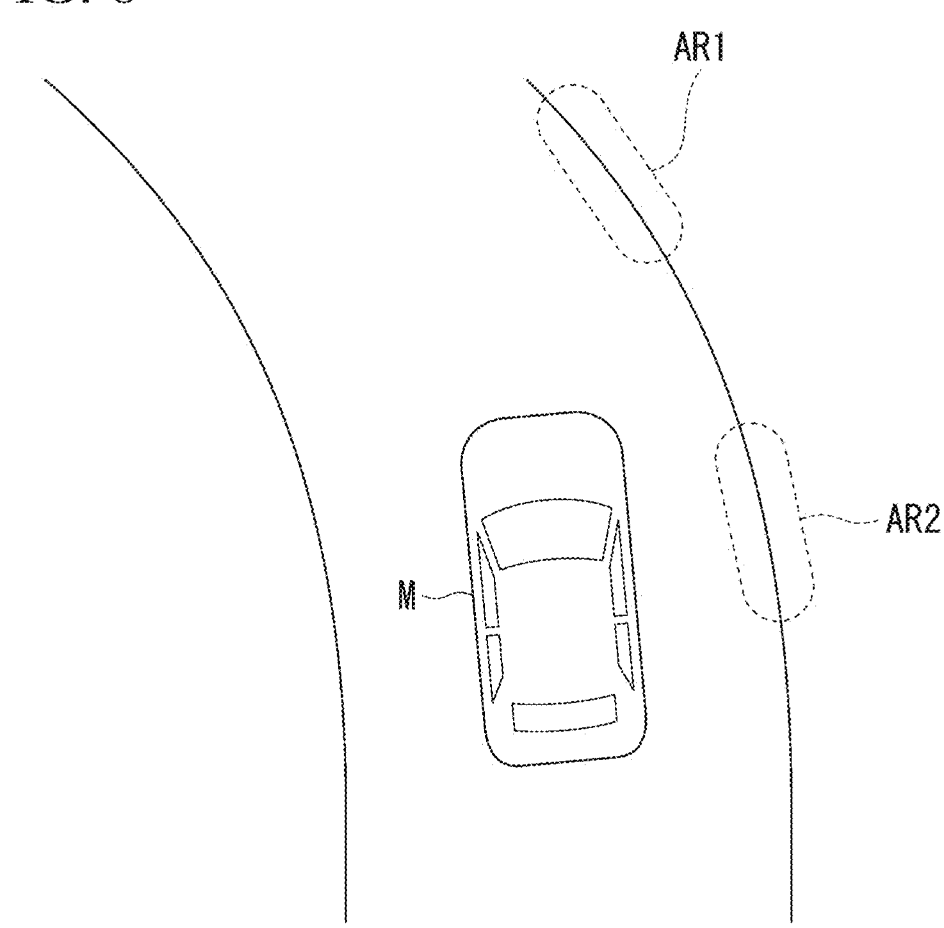
FIG. 8 is a diagram showing an example of a first region and a second region.

FIG. 8 is a diagram showing an example of a first region AR1 and a second region AR2. The first region AR1 is, for example, a region in front of the vehicle M. The first region AR1 is, for example, a region located several meters in front of the vehicle M or several tens of meters in front of the vehicle M. The first region AR1 may be changed with the velocity or acceleration of the vehicle M. The second region AR2 is, for example, a region in a lateral direction of the vehicle M or a region through which the vehicle M has passed.

Returning to the description of the flowchart, the driving assistance device 100 compares the curvature of the first region AR1 with the curvature of the second region AR2 and obtains a degree of change in curvature (step S108). The driving assistance device 100, for example, obtains the degree of change in the curvature of the first region AR1 with respect to the curvature of the second region AR2. The driving assistance device 100 may obtain a degree of change in curvature on the basis of a shape of a road marking on one side or may obtain a degree of change in curvature on the basis of shapes of road markings on both sides. The road marking on one side may be a road marking on an outer side with respect to the vehicle M (on the side opposite to a direction in which the steering wheel is turned) or may be a road marking on the side opposite thereto. When the road markings on both sides are used, the driving assistance device 100 may statistically process the degree of change in curvature obtained from each road marking and obtain the degree of change to be used for setting the threshold value. When the road markings on both sides are used, a larger degree of change in curvature may be preferentially adopted.

Next, the driving assistance device 100 obtains a threshold value (an operation timing) on the basis of the degree of change in curvature (step S110). For example, a threshold value is obtained as described in FIG. 4. As a result, the process of one routine of this flowchart is completed.

[Flowchart (Part 2)]

FIG. 9 is a flowchart showing another example of the flow of the process executed by the driving assistance device 100. First, the driving assistance device 100 determines whether or not a course along which the vehicle M moves is a target curved road (step S200). When the course is a target curved road, the driving assistance device 100 sets the threshold value determined in the flowchart of FIG. 7 described above (step S210). Subsequently, the driving assistance device 100 derives the remaining time before the vehicle M reaches the road marking (step S220).

Subsequently, the driving assistance device 100 determines whether or not the derived time is less than or equal to the threshold value (step S230). When the derived time is not less than or equal to the threshold value, the processing of step S240 is skipped. When the derived time is less than or equal to the threshold value, the driving assistance device 100 controls the alarm or steering to control the vehicle M so that the vehicle M does not deviate from the road marking (step S240). Thereby, the process of one routine of this flowchart is completed.

As described above, the driving assistance device 100 can perform the assistance for suppressing the vehicle's deviation from the road marking more appropriately in accordance with an environment by changing the operation timing in accordance with a degree of curve of the course.

In the above-described example, the operation timing is changed on the basis of an absolute value of the degree of change in curvature. Alternatively, the driving assistance device 100 may execute a first change process of changing the operation timing in accordance with the degree of change when the degree of change in curvature tends to increase (when the degree of change in curvature tends to be away from zero) and may execute a second change process different from the first change process when the degree of change in curvature tends to decrease (when the degree of change in curvature tends to be close to zero).

For example, the driving assistance device 100 executes the first change process of increasing the threshold value as the degree of change in the degree of curve increases when the degree of change in the course increases as the degree of curve of the course increases and executes the second change process different from the first change process when the degree of change increases as the degree of curve of the course decreases (as the degree of curve of the course approaches a straight line).

The second change process is a process of setting a preset threshold value (for example, a process of setting a threshold value during straight movement) regardless of the degree of change in the degree of curve of the course or a process of setting the threshold value to a second threshold value less than the first threshold value. The first threshold value is a threshold value that is set to a larger value as the degree of change in the degree of curve increases in the first change process (see FIG. 4). The second threshold value is a threshold value that is set to a larger value as the degree of change in the degree of curve increases when the degree of change increases in the second change process. The second threshold value is, for example, a threshold value in which the remaining time before the operation timing is reduced by a predetermined ratio with respect to the operation timing for each degree of change from the degree of change C1 to the degree of change C2 of FIG. 4 described above.

Figure 10:
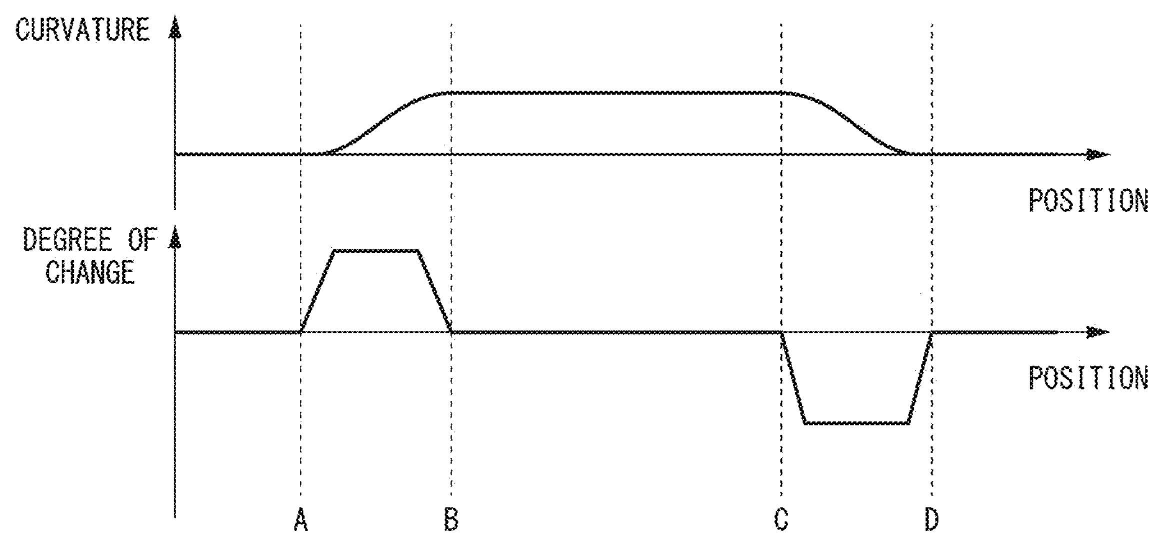
FIG. 10 is an explanatory diagram showing a timing when a first change process is executed and a timing when a second change process is executed.

FIG. 10 is an explanatory diagram showing a timing when the first change process is executed and a timing when the second change process is executed. Differences from FIG. 3 will be mainly described. Between position A and position B (at or near the entrance of the curved road), the degree of change increases as the degree of cover of the course increases. At this timing, the degree of change is a positive value. When the degree of change is the positive value, the first change process is executed. Between position C and position D (at or near the exit of the curved road), the degree of change increases as the degree of curve of the course decreases (as the degree of curve of the course approaches a straight line). At this timing, the degree of change is a negative value. When the degree of change is the negative value, the second change process is executed.

As described above, the driving assistance device 100 can more appropriately assist in suppressing the vehicle's deviation from the road marking in accordance with the environment by executing the first change process of changing the operation timing in accordance with the degree of change in the curvature of the course when the degree of change is a positive value and executing the second change process different from the first change process when the degree of change is a negative value.

For example, the driver may control the vehicle M at the exit of a curve so that the vehicle M is closer to the road marking on an outer side (or an inner side) of the curve. Even in this case, because the threshold value of the second change process is set to a time period less than the threshold value of the first change process, the operation of the lane departure suppression control is suppressed and a possibility that the driver will feel troublesome can be suggested.

At the entrance of the curve, the driver may overlook the curve or misrecognize the degree of change in the curve. Even in this case, because the threshold value of the first change process suitable for the above-described situation is set, assistance is provided to appropriately suppress the vehicle's deviation from the road marking.

In the above example, when the shape of the course is a curved road, the driving assistance device 100 may set a preset threshold value as the threshold value (for example, may set a threshold value during straight movement as the threshold value) in a process of setting the threshold value for the road marking on an inner side of the curved road or may set a threshold value based on a degree of change in the degree of curve of the course in a process of setting the threshold value for the road marking on an outer side of the curved road. Some drivers may recognize the curved road and control the vehicle to approach the road marking on the inner side of the curved road. According to this process, excessive assistance for the driver as described above can be suppressed. According to the above-described first embodiment, the driving assistance device 100 can more appropriately assist in suppressing the vehicle's deviation from the road marking in accordance with the environment by changing the threshold value on the basis of a degree of change in the degree of curve of the course and performing a control process of performing assistance for suppressing the vehicle M's deviation from the road marking when it is determined that the vehicle M is likely to deviate from the road marking.

Second Embodiment

Hereinafter, a second embodiment will be described. A process of changing the threshold value in accordance with whether or not the course is a curved road has been described in the first embodiment. In the second embodiment, a driving assistance device 100 changes an assistance timing on the basis of a shape of a road when a control process of performing assistance for suppressing a vehicle M's deviation from a road marking is performed if the vehicle M approaches a road marking of a course to a predetermined degree or more on the basis of a position of the road marking relative to the vehicle M and a state of the vehicle M. Specifically, the driving assistance device 100 performs a process of switching between a first process of setting the threshold value to a first threshold value that is a preset fixed value and a second process of setting the threshold value to a second threshold value that is a variable value (e.g., a process of making the threshold value of the first embodiment variable) on the basis of a shape of the course of the vehicle M. Hereinafter, the differences from the first embodiment will be mainly described.

In principle, the driving assistance device 100, for example, executes the first process when it is determined that the course of the vehicle M is not a curved road and executes the second process when it is determined that the course of the vehicle Mis a curved road. When it is determined that the course of the vehicle M is a curved road, the driving assistance device 100 sets a threshold value (a second threshold value) on the basis of the degree of change in the degree of curve of the course as described in the first embodiment. However, even if it is determined that the course is a curved road, the first process is executed according to the shape of the road. Another process may be executed instead of the first process. Another process is a process in which a threshold value is set to a threshold value less than the threshold value of the second process, even if the threshold value is variable. That is, in the second embodiment, it is only necessary for the threshold value setting process to differ according to the shape of the road.

Figure 11:
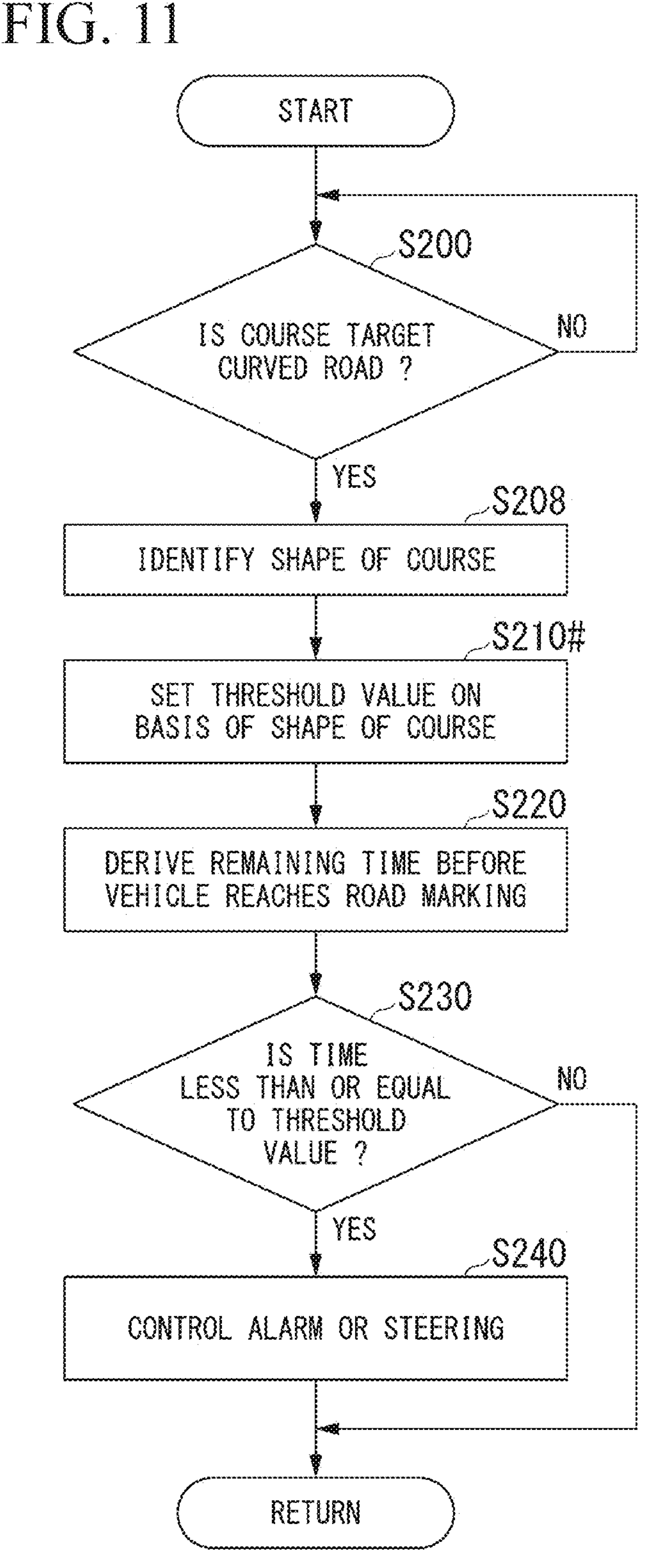
FIG. 11 is a flowchart showing an example of a flow of a process executed by the driving assistance device.

FIG. 11 is a flowchart showing an example of a flow of a process executed by the driving assistance device 100. Differences from FIG. 9 described above will be mainly described. First, the driving assistance device 100 determines whether or not a course along which the vehicle M moves is a target curved road (step S200). When the course is the target curved road, the threshold value is variable. The target curved road is, for example, a curved road having a radius of curvature less than or equal to a threshold value (for example, 1000 m or less). When the shape of the course is a curved road and the radius of curvature of the curve of the curved road exceeds a set threshold value, the driving assistance device 100 executes the first process. When the shape of the course is a curved road and the radius of curvature of the curve of the curved road is less than or equal to the set threshold value, the driving assistance device 100 executes the second process as follows.

When the course is a target curved road, the driving assistance device 100 identifies a shape of the course (step S208). Subsequently, the driving assistance device 100 sets a threshold value on the basis of the shape of the course (step S210 #). Subsequently, the driving assistance device 100 derives the remaining time before the vehicle M reaches the road marking (step S220).

Subsequently, the driving assistance device 100 determines whether or not the derived time is less than or equal to the threshold value (step S230). When the derived time is not less than or equal to the threshold value, the processing of step S240 is skipped. When the derived time is less than or equal to the threshold value, the driving assistance device 100 controls the alarm or steering to control the vehicle M so that the vehicle M does not deviate from the road marking (step S240). Thereby, the process of one routine of this flowchart is completed.

According to the above-described process, because the driving assistance device 100 can set a threshold value according to the shape of the road, it is possible to assist in suppressing the vehicle's deviation from the road marking more appropriately in accordance with the environment. Hereinafter, the process in a specific scene will be described.

[Scene 1]

When the shape of the course is a curved road, the driving assistance device 100 executes the first process of setting the threshold value for the road marking on an inner side of the curved road and executes the second process for setting the threshold value for the road marking on an outer side of the curved road. This process is an example of a process of switching between the first process and the second process on the basis of the shape of the road.

Figure 12:
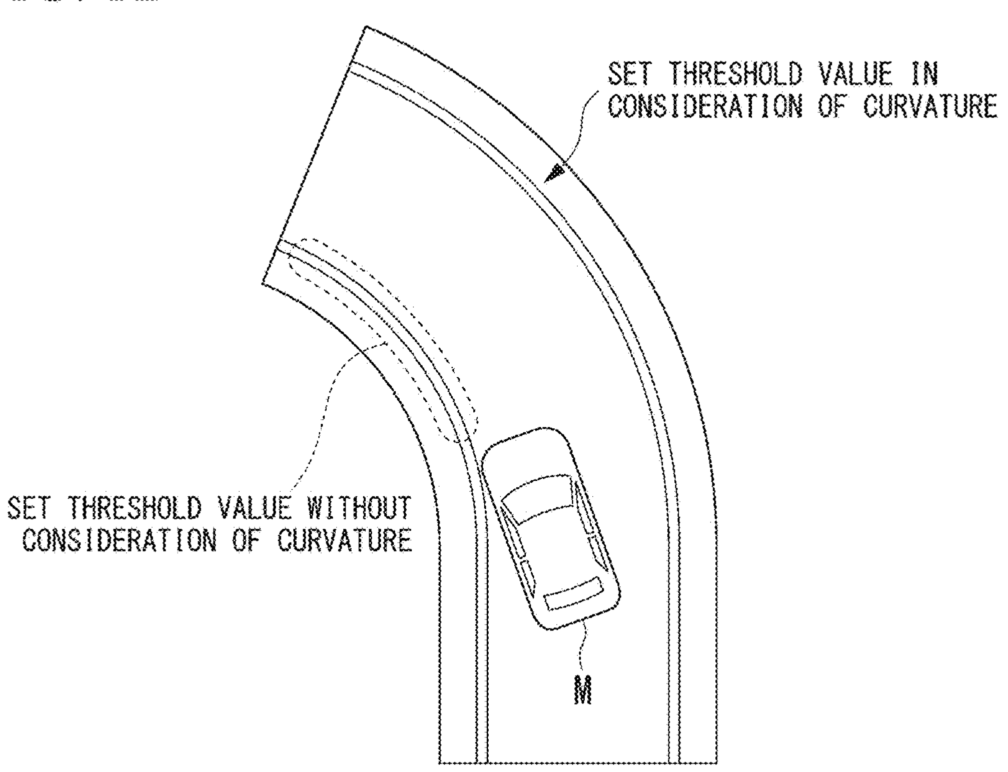
FIG. 12 is an explanatory diagram showing a process in scene 1.

FIG. 12 is an explanatory diagram showing the process in scene 1. The driving assistance device 100 sets a threshold value for the road marking on an outer side of the curved road in accordance with the degree of change in curvature and sets a threshold value for the road marking on an inner side of the curved road to a preset threshold value. Instead of the preset threshold value, the threshold value may be a threshold value corresponding to the degree of change in curvature and may be set to a threshold value less than the threshold value for the road marking on an outer side of the curved road.

By setting the threshold value as described above, even if the driver moves the vehicle M according to the inside of the curve, the lane departure suppression control is appropriately operated and the operation of the excessive lane departure suppression control is suppressed.

[Scene 2]

When the shape of the course is a curved road, the driving assistance device 100 executes the first process if a width of a lane of the course is less than or equal to a predetermined width (for example, 2.5 m) and executes the second process if the width of the lane of the course exceeds the predetermined width. This process is another example of a process of switching between the first process and the second process on the basis of the shape of the road.

Figure 13:
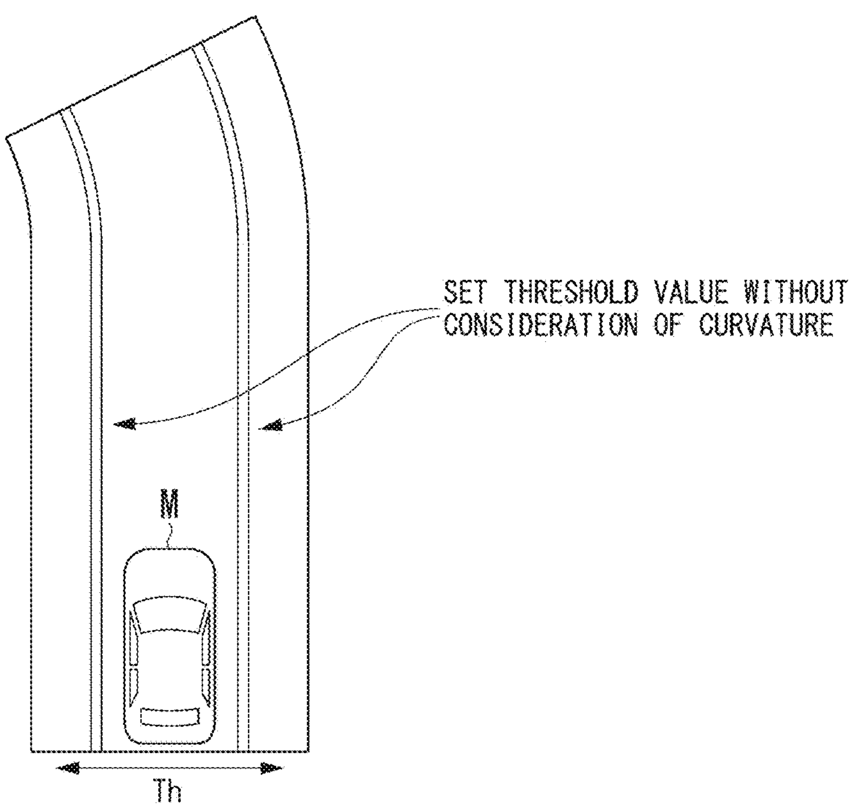
FIG. 13 is an explanatory diagram showing a process in scene 2.

FIG. 13 is an explanatory diagram showing the process in scene 2. As shown in FIG. 12, during movement on the curved road where the threshold value is normally variable in accordance with the degree of change in curvature, the driving assistance device 100 sets the threshold value for the road marking to a preset threshold value when a distance between the road markings is less than or equal to the threshold value (Th or less).

By setting the threshold value as described above, an excessive operation of the lane departure suppression control due to the staggering of the vehicle or the like is suppressed.

[Scene 3]

Figure 14:
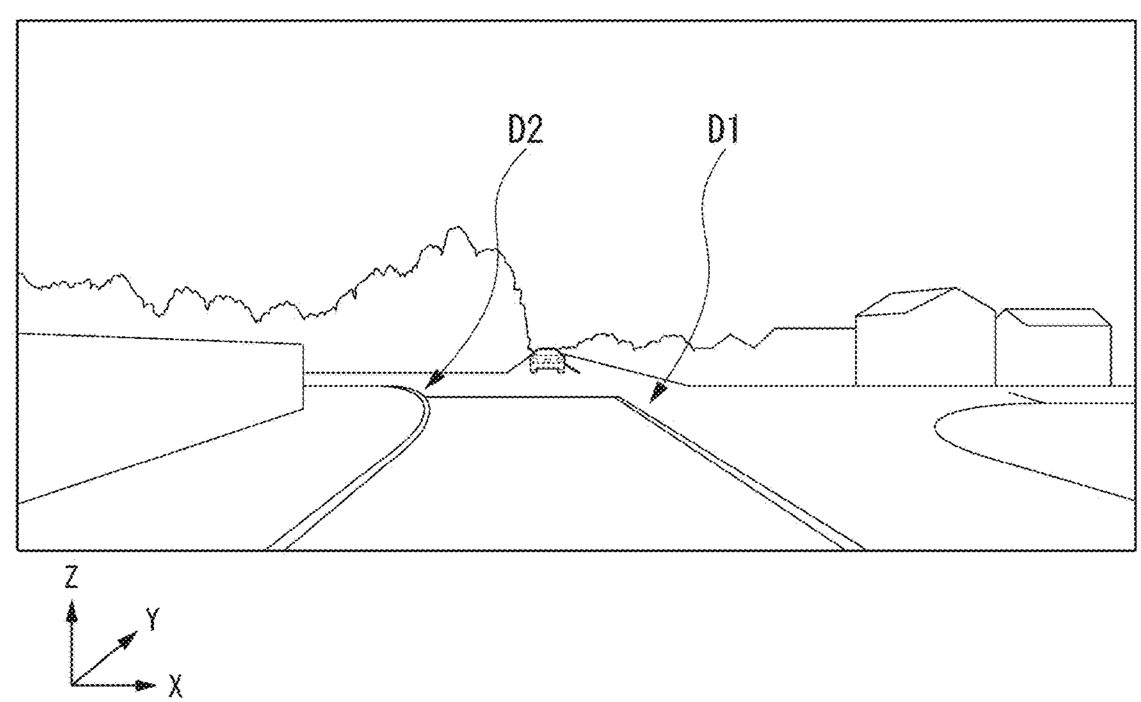
FIG. 14 is a diagram showing an example of an image captured by a camera.

FIG. 14 is a diagram showing an example of an image captured by the camera 10. When the vehicle M passes through an intersection, the camera 10 captures the image shown in FIG. 14. The recognizer 110 recognizes a road marking D1 and a road marking D2 at or near the intersection. The road marking D1 is a road marking marked near the center of the road. The road marking D2 is a road marking marked at an end in a width direction on a side where the vehicle M of the road is moving. The driving assistance device 100 derives the curvature of a course on the basis of a recognition result of the recognizer 110. For example, the driving assistance device 100 adopts curvature having a larger degree of change between the curvature of the road marking D1 and the curvature of the road marking D2. In the example of FIG. 14, the degree of change in the curvature of the road marking D2 is adopted.

Figure 15:
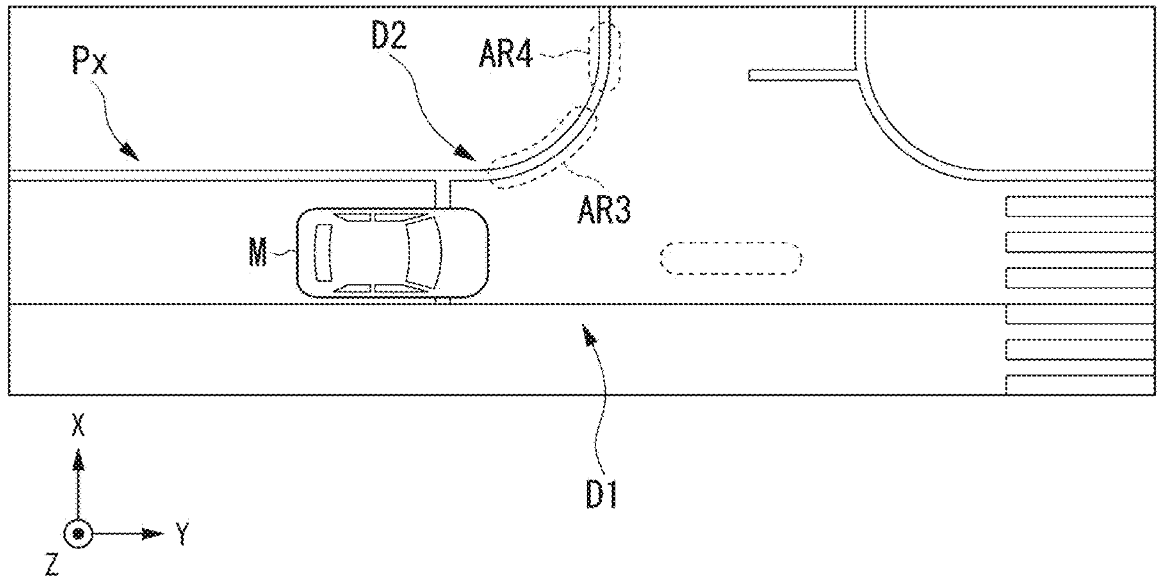
FIG. 15 is a diagram of a scene of an intersection and a region near the intersection seen from above.

FIG. 15 is a diagram of a scene of an intersection and a region near the intersection seen from above. For example, the recognizer 110 can recognize a road marking D2 in a region AR3 of FIG. 14 (at or near the entrance of the intersection) and cannot recognize the road marking D2 in a region AR4 (a region in front of the region AR3). The road marking D2 of the region AR4 extends in the width direction of the vehicle M and the reliability level of a recognition process of the recognizer 110 may be low or recognition may be blocked by an obstacle such as a curb (see FIG. 14). The low reliability level means that the driving assistance device 100 cannot recognize the type of road marking (a solid line, a dashed line, a double dashed line, or the like), the reliability level of recognition may be low, and the like. The reliability level is derived by applying an algorithm for determining a predetermined reliability level. For example, when a score obtained from the algorithm is less than a threshold value, it is determined that the reliability level is low.

Figure 16:
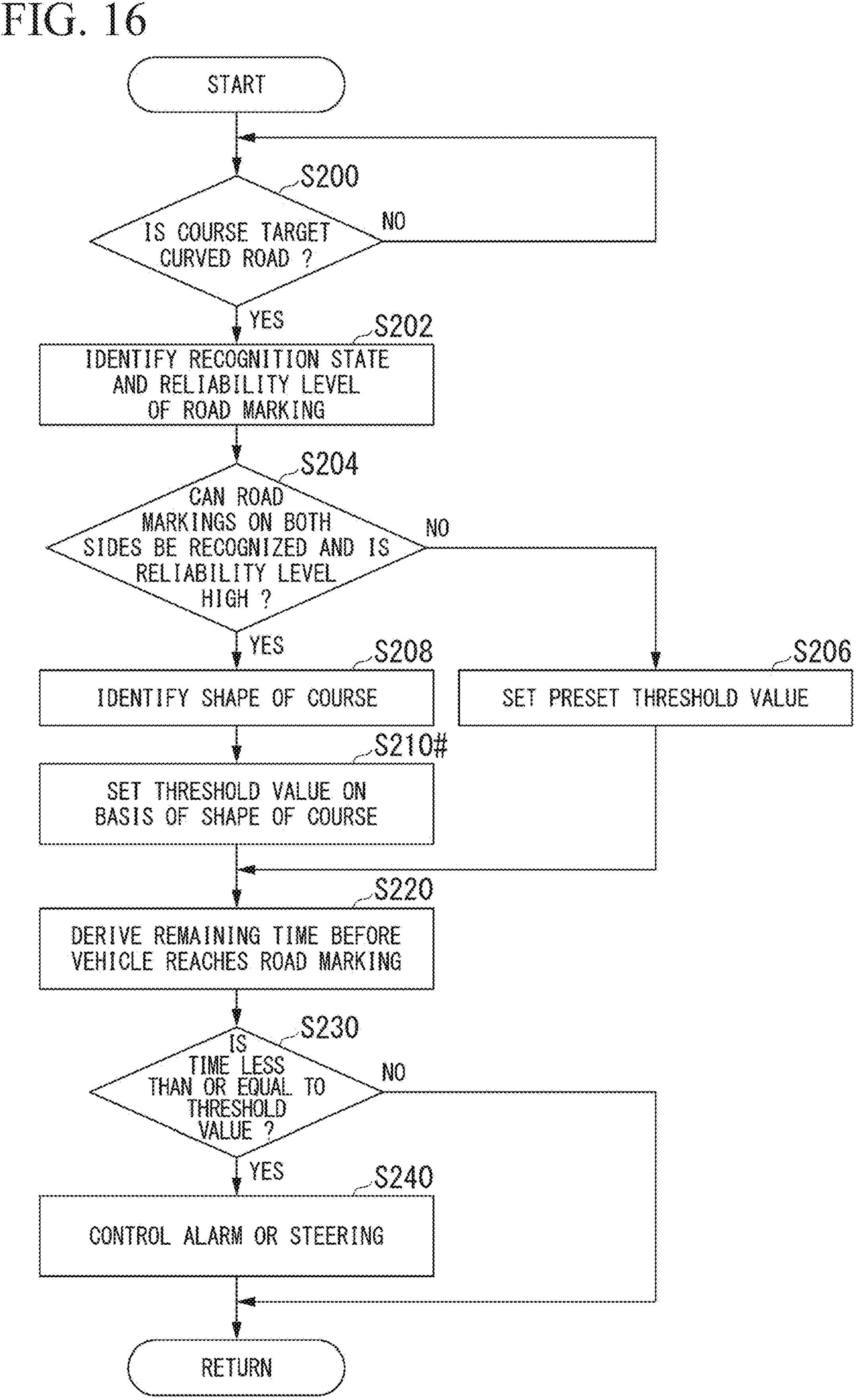
FIG. 16 is a flowchart showing an example of a flow of a process executed by the driving assistance device.

In the situation as described above, it is not desirable for the driving assistance device 100 to set a threshold value on the basis of a degree of change in the curvature of the road marking D2. The degree of change in the curvature of the road marking D2 of the region AR3 is greater than the degree of change in the curvature of the road marking D1. Hypothetically, when the driving assistance device 100 uses the result of recognition of the road marking D2 in the region AR3, the threshold value is variable. However, because the course is in a direction in which the road marking D1 is extended and not in a direction in which the road marking D2 is extended, it should be decided whether the threshold value should be variable on the basis of the degree of change in the curvature of the road marking D1. Therefore, a control process is performed to deal with the situation of scene 3 so that the process shown in FIG. 16 is performed, the degree of change in the curvature of the road marking D2 is not adopted, and a preset threshold value is adopted.

The driving assistance device 100 executes the first process when one of the road markings on both sides of the course cannot be recognized and executes the second process when both road markings on both sides of the course can be recognized. In the examples of FIGS. 14 and 15, because the road marking D1 is recognized and the road marking D2 of the region AR4 is not recognized, the first process is executed.

When one of the road markings on both sides of the course cannot be recognized, the driving assistance device 100 executes the first process from a predetermined distance before a point where one of the road markings cannot be recognized. The predetermined distance is a predetermined distance, for example, before the region AR3 or the region AR4 of FIG. 15. For example, it is at or near a position Px of FIG. 15.

[Flowchart]

Instead of (or in addition to) a process of the flowchart of FIG. 11, a process of the flowchart of FIG. 16 may be executed. FIG. 16 is a flowchart showing an example of a flow of a process executed by the driving assistance device 100. First, the driving assistance device 100 determines whether or not a course along which the vehicle M moves is a target curved road (step S200). When the course is a target curved road, the driving assistance device 100 identifies a recognition state and a reliability level of the road marking (step S202). On the basis of an identification result of step S202, the driving assistance device 100 determines whether or not the road markings on both sides can be recognized and the reliability level of recognition of the road markings on both sides is high (whether or not the reliability level is greater than or equal to a threshold value) (step S204). When the road markings on both sides can be recognized and the reliability level of recognition of the road markings on both sides is high, the driving assistance device 100 sets a preset threshold value (step S206) and moves to the processing of step S220.

When the road markings on both sides cannot be recognized or when the reliability level of recognition of both or one of the road markings is low, the driving assistance device 100 identifies a shape of the course (step S208). Subsequently, the driving assistance device 100 sets a threshold value on the basis of the shape of the course (step S210 #). For example, a threshold value is set as described in scenes 1 and 2 or a threshold value is set as described in scene 3 to be described below.

Subsequently, the driving assistance device 100 derives the remaining time before the vehicle M reaches the road marking (step S220). Subsequently, the driving assistance device 100 determines whether or not the derived time is less than or equal to the threshold value (step S230). When the derived time is not less than or equal to the threshold value, the processing of step S240 is skipped. When the derived time is less than or equal to the threshold value, the driving assistance device 100 controls the alarm or steering to control the vehicle M so that the vehicle M does not deviate from the road marking (step S240). Thereby, the process of one routine of this flowchart is completed.

As described above, the driving assistance device 100 can more appropriately assist in suppressing the vehicle's deviation from the road marking in accordance with the environment by setting a threshold value on the basis of a result of recognition of one road marking D2.

In the process of the flowchart of FIG. 16, the first process may be performed when it is determined that the vehicle M will pass through the intersection.

Some of the processes in each of the above flowcharts (FIGS. 7, 9, 11, and 16) may be changed or omitted. For example, the processing of step S200 of FIG. 16 may be omitted.

The embodiment described above can be represented as follows.

A control device including:

a storage device storing a program; and a hardware processor, the hardware processor executing the program stored in the storage device to:

recognize a road marking of a course of a vehicle, determine that the vehicle is likely to deviate from the road marking when it is determined that the remaining time before the vehicle reaches the road marking obtained on the basis of a position of the road marking relative to the vehicle and a state of the vehicle is less than or equal to a threshold value, change the threshold value on the basis of a degree of change in a degree of curve of the course, and control assistance for suppressing the vehicle's deviation from the road marking when it is determined that the vehicle is likely to deviate from the road marking.

The embodiment described above can be represented as follows.

A control device including:

a storage device storing a program; and a hardware processor, the hardware processor executing the program stored in the storage device to:

recognize a road marking of a course of a vehicle, determine that the vehicle is likely to deviate from the road marking when it is determined that the remaining time before the vehicle reaches the road marking obtained on the basis of a position of the road marking relative to the vehicle and a state of the vehicle is less than or equal to a threshold value, perform a control process of performing assistance for suppressing the vehicle's deviation from the road marking when it is determined that the vehicle is likely to deviate from the road marking; and perform a process of switching between a first process of setting the threshold value to a first threshold value that is a preset fixed value and a second process of setting the threshold value to a second threshold value that is a variable value on the basis of a shape of the course of the vehicle.

Although modes for carrying out the present invention have been described above using embodiments, the present invention is not limited to the embodiments and various modifications and substitutions can also be made without departing from the scope and spirit of the present invention.

What is claimed is:

1. A vehicle control device comprising:

a storage medium storing computer-readable instructions; and at least one processor connected to the storage medium, the processor executing the computer-readable instructions to:

recognize a road marking of a course of a vehicle, determine that the vehicle is likely to deviate from the road marking when it is determined that the remaining time before the vehicle reaches the road marking obtained on the basis of a position of the road marking relative to the vehicle and a state of the vehicle is less than or equal to a threshold value, change the threshold value on the basis of a degree of change in a degree of curve of the course, and control assistance for suppressing the vehicle's deviation from the road marking when it is determined that the vehicle is likely to deviate from the road marking, wherein the at least one processor:

executes a first change process of increasing the threshold value as the degree of change in the degree of curve increases when the degree of change increases as the degree of curve increases, and executes a second change process different from the first change process when the degree of change increases as the degree of curve decreases, wherein the second change process is a process of setting a preset threshold value regardless of the degree of change in the degree of curve or a process of setting the threshold value to a second threshold value less than a first threshold value, wherein the first threshold value is a set threshold value that increases as the degree of change in the degree of curve increases when the degree of change increases in the first change process, and wherein the second threshold value is a set threshold value that increases as the degree of change in the degree of curve increases when the degree of change increases in the second change process.

2. The vehicle control device according to claim 1, wherein the at least one processor increases the threshold value as the degree of change in the degree of curve increases.

3. The vehicle control device according to claim 1, wherein the at least one processor sets the threshold value to a first threshold value when the degree of change in the degree of curve is greater than or equal to a first degree of change, and sets the threshold value to a second threshold value less than the first threshold value when the degree of change in the degree of curve is less than the first degree of change.

4. The vehicle control device according to claim 1, wherein the at least one processor sets the threshold value to a third threshold value when the degree of change in the degree of curve is greater than or equal to a second degree of change, and increases the threshold value from a fourth threshold value to the third threshold value as the degree of change increases between the third threshold value and the fourth threshold value less than the third threshold value when the degree of change in the degree of curve is less than the second degree of change and exceeds the third threshold value.

5. The vehicle control device according to claim 1, wherein, when the at least one processor determines that the vehicle is likely to deviate from the road marking, a notification related to a deviation possibility is provided to a driver of the vehicle using a notifier or a steering control process is assisted so that the vehicle does not deviate from the road marking.

6. The vehicle control device according to claim 1, wherein, when a shape of the course is a curved road, the at least one processor sets a preset threshold value as the threshold value in a threshold value setting process for a road marking on an inner side of the curved road, and sets the threshold value based on the degree of change in the degree of curve of the course in a threshold value setting process for a road marking on an outer side of the curved road.

7. A vehicle control device comprising:

a storage medium storing computer-readable instructions; and at least one processor connected to the storage medium, the processor executing the computer-readable instructions to:

recognize a road marking of a course of a vehicle, perform a control process of providing a notification to a driver of the vehicle or an assistance control process of assisting in driving of the driver so that the vehicle does not deviate from the road marking when it is determined that the remaining time before the vehicle reaches the road marking obtained on the basis of a position of the road marking relative to the vehicle and a state of the vehicle is less than or equal to a threshold value, and change a timing when the assistance control process starts on the basis of a degree of change in a degree of curve of the course of the vehicle, wherein the at least one processor:

executes a first change process of increasing the threshold value as the degree of change in the degree of curve increases when the degree of change increases as the degree of curve increases, and executes a second change process different from the first change process when the degree of change increases as the degree of curve decreases, wherein the second change process is a process of setting a preset threshold value regardless of the degree of change in the degree of curve or a process of setting the threshold value to a second threshold value less than a first threshold value, wherein the first threshold value is a set threshold value that increases as the degree of change in the degree of curve increases when the degree of change increases in the first change process, and wherein the second threshold value is a set threshold value that increases as the degree of change in the degree of curve increases when the degree of change increases in the second change process.

8. The vehicle control device according to claim 7, wherein the at least one processor advances the timing as the degree of change in the degree of curve increases.

9. A vehicle control method comprising:

recognizing, by a computer, a road marking of a course of a vehicle;

determining, by the computer, that the vehicle is likely to deviate from the road marking when it is determined that the remaining time before the vehicle reaches the road marking obtained on the basis of a position of the road marking relative to the vehicle and a state of the vehicle is less than or equal to a threshold value;

changing, by the computer, the threshold value on the basis of a degree of change in a degree of curve of the course;

controlling, by the computer, assistance for suppressing the vehicle's deviation from the road marking when it is determined that the vehicle is likely to deviate from the road marking;

executing, by the computer, a first change process of increasing the threshold value as the degree of change in the degree of curve increases when the degree of change increases as the degree of curve increases; and executing, by the computer, a second change process different from the first change process when the degree of change increases as the degree of curve decreases, wherein the second change process is a process of setting a preset threshold value regardless of the degree of change in the degree of curve or a process of setting the threshold value to a second threshold value less than a first threshold value, wherein the first threshold value is a set threshold value that increases as the degree of change in the degree of curve increases when the degree of change increases in the first change process, and wherein the second threshold value is a set threshold value that increases as the degree of change in the degree of curve increases when the degree of change increases in the second change process.

* * * * *